(12) United States Patent
Takeda (10) Patent No.: US 10,243,493 B2
(45) Date of Patent: Mar. 26, 2019

(54) MOTOR CONTROL DEVICE AND IMAGE FORMING APPARATUS

(71) Applicant: CANON KABUSHIKI KAISHA, Tokyo (JP)

(72) Inventor: Shoji Takeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/832,611

(22) Filed: Dec. 5, 2017

(65) Prior Publication Data

US 2018/0167006 A1    Jun. 14, 2018

(30) Foreign Application Priority Data

Dec. 9, 2016  (JP) ................. 2016-239281

(51) Int. Cl.
  *H02P 8/14* (2006.01)
  *H02P 8/32* (2006.01)
  *G03G 15/00* (2006.01)
  *H02P 8/04* (2006.01)
  *H02P 23/20* (2016.01)

(52) U.S. Cl.
  CPC .......... *H02P 8/32* (2013.01); *G03G 15/5008* (2013.01); *G03G 15/80* (2013.01); *H02P 8/04* (2013.01); *H02P 23/20* (2016.02); *H02P 2209/11* (2013.01)

(58) Field of Classification Search
  None
  See application file for complete search history.

(56) References Cited

U.S. PATENT DOCUMENTS

| 3,777,246 A | * | 12/1973 | Barnes | G11B 15/20 318/685 |
| 5,572,105 A | * | 11/1996 | Nojima | H02P 8/22 318/599 |
| 5,982,134 A | * | 11/1999 | Tanaka | H02P 8/22 318/685 |
| 6,013,999 A | * | 1/2000 | Howard | H02P 8/00 318/585 |

(Continued)

FOREIGN PATENT DOCUMENTS

| JP | 4-322199 A | 11/1992 |
| JP | 2005-328681 A | 11/2005 |

*Primary Examiner* — Bentsu Ro
(74) *Attorney, Agent, or Firm* — Canon U.S.A., Inc. IP Division (57) ABSTRACT

A pulse generation unit is configured to output pulse signals for driving the stepping motor. A control unit is configured to perform acceleration control or deceleration control of the stepping motor via the pulse generation unit. The control unit is configured to calculate a number of the pulse signals to be output from the pulse generation unit to the stepping motor when accelerating or decelerating the stepping motor at constant acceleration in the acceleration control or the deceleration control based on an initial speed of the stepping motor when the acceleration control or the deceleration control starts, a target rotation speed, and time from start control of the stepping motor to time when the stepping motor reaches the target rotation speed, and change a rotation speed of the stepping motor in the acceleration control or the deceleration control along a sinusoidal waveform.

12 Claims, 9 Drawing Sheets

(56) References Cited

U.S. PATENT DOCUMENTS 6,194,863 B1 * 2/2001 Mainberger .............. H02P 8/22
318/602
2016/0352271 A1 * 12/2016 Kimura .................... H02P 8/18

\* cited by examiner

MOTOR CONTROL DEVICE AND IMAGE FORMING APPARATUS

BACKGROUND OF THE INVENTION

Field of the Invention

One disclosed aspect of the embodiments relates to a motor control device that controls a stepping motor, and an electrophotographic image forming apparatus including a motor control device.

Description of the Related Art

Conventionally, when load weight and rotation of the stepping motor is controlled, step-out of a stepping motor occurs if driving of a document conveyance, rotation of a photosensitive drum, or the like is started immediately at a target speed. Therefore, control for gradually accelerating a stepping motor from a speed in the self-start region to a target speed has been performed. In control in a case of switching conveyance paths to reverse the front and back sides of a document, the stepping motor is stopped when the document is at a predetermined distance from a sheet sensor after the document passes through the sheet sensor, and then rotated in the opposite direction. Also in this case, in order to increase the speed of the entire image forming apparatus, acceleration and deceleration control beyond the self-start region is performed, and pulse number control is also needed. For example, Japanese Patent Application Laid-Open Nos. 2005-328681 and 4-322199 discuss a control device that controls the rotation of a stepping motor.

Figure 9:
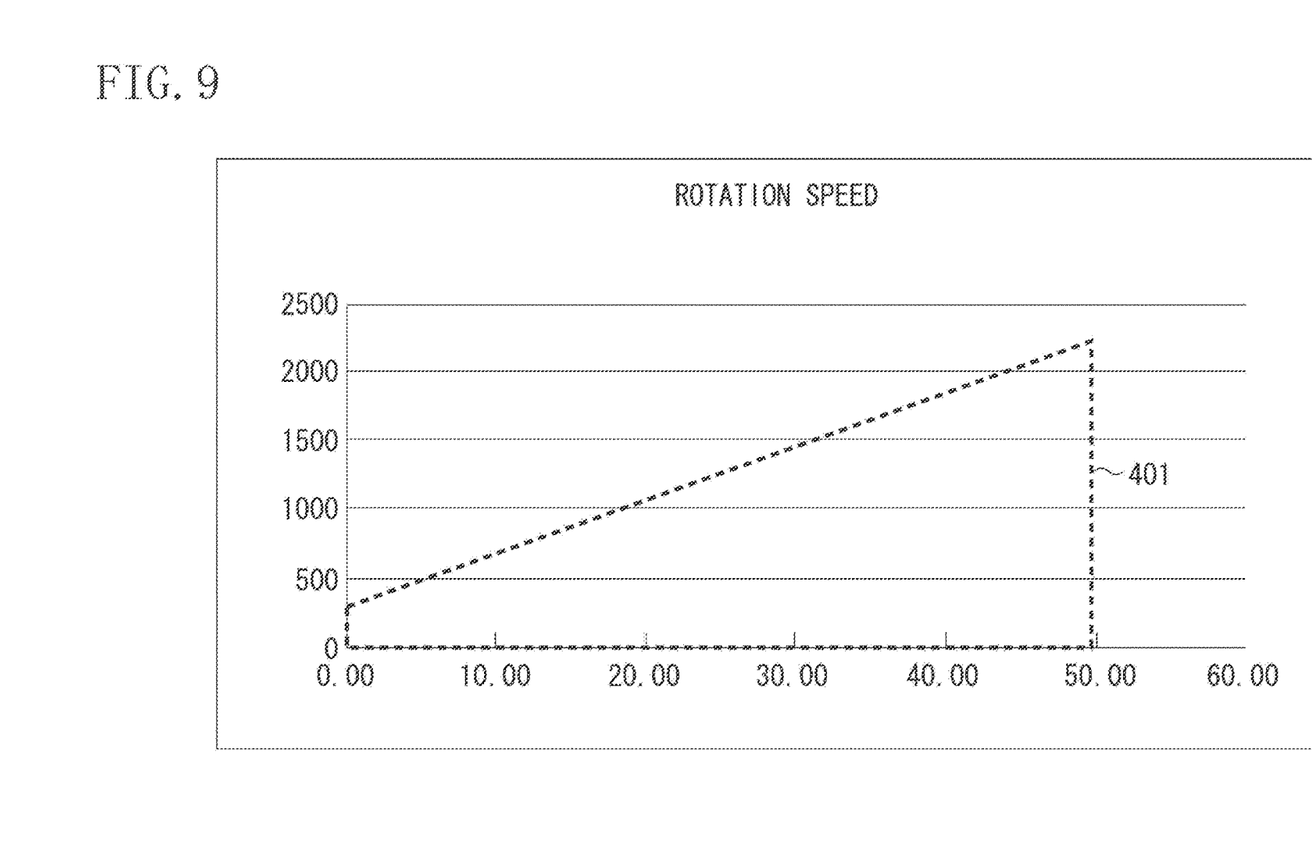
FIG. 9 is a speed diagram of a conventional stepping motor.

Conventionally, when acceleration/deceleration control and position control (pulse number control) of a stepping motor are performed at a same time, a speed data table (Table 1) is prepared beforehand and stepping motor control to be described below is performed. Specifically, in the conventional control, data (time) corresponding to the number of pulses in Table 1 is set to a timer for each pulse of a drive signal for driving the stepping motor, pulse signals each having time set to the timer as a specified period are sequentially generated, and the pulse signals are supplied to the stepping motor. FIG. 9 is a speed graph when acceleration control of the stepping motor is performed using the speed table of Table 1. In FIG. 9, the rotation speed of the stepping motor at the start is 310 pps (pulse/second), which is within the self-start speed range, and the rotation speed of the stepping motor when 49.57 ms (milliseconds) have elapsed from the start is 2300 pps. The detailed description of Table 1 and FIG. 9 will be provided below.

However, as illustrated in FIG. 9, if the stepping motor is accelerated or decelerated linearly (constant acceleration), practically the rotation speed is beyond the target speed after the rotation speed reaches the target speed, causing overshoot or undershoot. Therefore, it has been necessary to provide stabilization time until the rotation speed of the stepping motor stabilizes, or to control the driving power supplied to the stepping motor to be increased to suppress the rotation speed. Alternatively, by controlling the rotation speed of the stepping motor along a gentle curve to reach the target speed rather than acceleration/deceleration control with constant acceleration/deceleration, occurrence of overshoot and undershoot can be avoided. In acceleration/deceleration control with constant acceleration/deceleration control, speed control by specifying the number of pulses is possible. However, when the rotation speed is controlled along a gentle curve, calculation of the rotation speed of the stepping motor is required each time, causing a problem that control of the stepping motor by specifying the numbers of pulses, which has been performed conventionally, is not possible.

SUMMARY OF THE INVENTION

One disclosed aspect of the embodiments is directed to a technique capable of smooth acceleration/deceleration control of a stepping motor by specifying the numbers of pulses.

According to an aspect of the embodiments, a motor control device includes a pulse generation unit and a controller. The pulse generation unit is connected to a stepping motor and is configured to output pulse signals for driving the stepping motor. The controller is configured to control the pulse generation unit to perform acceleration control or deceleration control of the stepping motor. The controller calculates a number of the pulse signals to be output from the pulse generation unit to the stepping motor when accelerating or decelerating the stepping motor at constant acceleration in the acceleration control or the deceleration control based on an initial speed of the stepping motor when the acceleration control or the deceleration control starts, a target rotation speed, and time from start of the acceleration control or the deceleration control of the stepping motor to time when the stepping motor reaches the target rotation speed, and wherein the controller change a rotation speed of the stepping motor in the acceleration control or the deceleration control along a sinusoidal waveform.

Further features of the disclosure will become apparent from the following description of exemplary embodiments with reference to the attached drawings.

DESCRIPTION OF THE EMBODIMENTS

Hereinafter, an exemplary embodiment will be described in detail with reference to the drawings.

<Acceleration/Deceleration Control of Stepping Motor>

First, conventional acceleration control of a stepping motor will be described for comparison with the exemplary embodiment to be described below. Deceleration control of a stepping motor is similar to the acceleration control, and description thereof is omitted here. Conventionally, when acceleration control and position control (pulse number control) of a stepping motor are performed at the same time, a speed data table (Table 1) for acceleration control provided below is prepared in advance. Table 1 is a speed table in a case where the rotation speed of a stepping motor is controlled to reach 2300 pps when a pulse signal for driving the stepping motor is input 65 times from a state where the stepping motor is stopped. Table 1 lists elapsed time and the rotation speeds of the stepping motor corresponding to a first pulse signal to a 65th pulse signal. The time in Table 1 lists the accumulated elapsed time (unit: ms (milliseconds)) from the state where the stepping motor is stopped until the pulse of 65th pulse is input. The speeds in Table 1 represent the rotation speeds (unit: pps (pulse/second)) of the stepping motor between pulses. In stepping motor control, data (time) corresponding to the number of pulses in Table 1 is set to the timer for each pulse of a drive signal, and pulse signals having respective periods set to the timer (a drive signal for driving the stepping motor) are sequentially generated and supplied to the stepping motor. Accordingly, the stepping motor is driven at the rotation speeds corresponding to the specified periods.

TABLE 1

| Number of Pulses | Time | Speed |
|---|---|---|
| 1 | 0.00 | 310 |
| 2 | 3.23 | 437 |
| 3 | 5.52 | 533 |
| 4 | 7.39 | 610 |
| 5 | 9.03 | 678 |
| 6 | 10.51 | 739 |
| 7 | 11.86 | 794 |
| 8 | 13.12 | 845 |
| 9 | 14.30 | 894 |
| 10 | 15.42 | 939 |
| 11 | 16.49 | 982 |
| 12 | 17.51 | 1024 |
| 13 | 18.48 | 1063 |
| 14 | 19.42 | 1101 |
| 15 | 20.33 | 1138 |
| 16 | 21.21 | 1173 |
| 17 | 22.06 | 1208 |
| 18 | 22.89 | 1241 |
| 19 | 23.70 | 1274 |
| 20 | 24.48 | 1305 |
| 21 | 25.25 | 1336 |
| 22 | 26.00 | 1366 |
| 23 | 26.73 | 1395 |
| 24 | 27.44 | 1424 |
| 25 | 28.15 | 1452 |
| 26 | 28.84 | 1480 |
| 27 | 29.51 | 1507 |
| 28 | 30.17 | 1533 |
| 29 | 30.83 | 1560 |
| 30 | 31.47 | 1585 |
| 31 | 32.10 | 1610 |
| 32 | 32.72 | 1635 |
| 33 | 33.33 | 1660 |
| 34 | 33.93 | 1684 |
| 35 | 34.53 | 1707 |
| 36 | 35.11 | 1731 |
| 37 | 35.69 | 1754 |
| 38 | 36.26 | 1776 |
| 39 | 36.82 | 1799 |
| 40 | 37.38 | 1821 |
| 41 | 37.93 | 1842 |
| 42 | 38.47 | 1864 |
| 43 | 39.01 | 1885 |
| 44 | 39.54 | 1906 |
| 45 | 40.06 | 1927 |
| 46 | 40.58 | 1948 |
| 47 | 41.10 | 1968 |
| 48 | 41.60 | 1988 |
| 49 | 42.11 | 2008 |

TABLE 1-continued

| Number of Pulses | Time | Speed |
|---|---|---|
| 50 | 42.61 | 2028 |
| 51 | 43.10 | 2047 |
| 52 | 43.59 | 2066 |
| 53 | 44.07 | 2085 |
| 54 | 44.55 | 2104 |
| 55 | 45.03 | 2123 |
| 56 | 45.50 | 2142 |
| 57 | 45.96 | 2160 |
| 58 | 46.43 | 2178 |
| 59 | 46.89 | 2196 |
| 60 | 47.34 | 2214 |
| 61 | 47.79 | 2231 |
| 62 | 48.24 | 2249 |
| 63 | 48.69 | 2266 |
| 64 | 49.13 | 2283 |
| 65 | 49.57 | 2300 |

For example, rotation control of the stepping motor in a case of stopping conveyance of a document when the sheet sensor detects the document that is being conveyed while the document is conveyed by rotating the stepping motor at the speed of 2300 pps (pulse/second) will be described. At that time, the document is stopped at a position of the 100th pulse of the stepping motor from a position where the sheet sensor is disposed. In this case, even if the sheet sensor detects the document during the conveyance of the document, the stepping motor maintains its rotation speed at that time until the 35th pulse from the detection of the document. From the 36th pulse, the stepping motor then switches its rotation speed from 2300 pps, which corresponds to the number of pulses 65 in Table 1, to rotation speeds corresponding to the numbers of pulses obtained by decreasing the current number of pulses in Table 1 sequentially (the number of pulses is 64, 63, . . . ). Finally, the stepping motor outputs the speed 310 pps corresponding to the number of pulses 1 in Table 1 and is stopped. As a result, it is possible to stop the document at the position of 100 pulses (=35 pulses+65 pulses) after the sheet sensor detects the document.

FIG. 9 is a speed graph when acceleration control of the stepping motor is performed using the speed table of Table 1. The vertical axis represents the rotation speed of the stepping motor and the horizontal axis represents the time (elapsed time from acceleration of the stepping motor). In FIG. 9, the rotation speed of the stepping motor at the start is 310 pps, which is within the self-start speed range, and the rotation speed of the stepping motor when the 49.57 ms (milliseconds) have elapsed from the start is 2300 pps. In FIG. 9, every time when one pulse of the drive signal (pulse signal) is output to the stepping motor, period time of one pulse corresponding to the rotation time elapses. Therefore, in FIG. 9, since (elapsed time for one pulse)×(rotation speed of the stepping motor at that time)=an area for one pulse, the following equation can be obtained: (elapsed time)×(speed)=(value of the horizontal axis in FIG. 9)×(value of the vertical axis in FIG. 9)=area=the total number of pulses. In other words, in FIG. 9, the area of a trapezoid 401 surrounded by the broken line corresponds to 65 pulses of the stepping motor.

Now, a method for generating the speed data table of Table 1 will be described. For example, the speed data in Table 1 is generated so that the speed line indicating an acceleration state in FIG. 9 is a straight line (constant acceleration). In this case, the number of pulses from the self-start speed (310 pps) to the target speed (2300 pps) is the area of the trapezoid 401 (indicated by the broken line in FIG. 9) illustrated in FIG. 9. By actually calculating using the above equation, the result: the number of pulses=((310 pps (pulse/second)+2300 pps (pulse/second))/1000)×49.57 ms (milliseconds)/2=64.69 (pulse) is obtained. Here, by defining N as the number of pulses, Vs as the initial speed, Vo as the target speed, and T as the acceleration time, the above equation is expressed as N=(Vs+Vo)×T/2. By converting this equation with assumption that the initial speed Vs is renewed (updated) every time when one pulse of the drive signal, which includes pulse signals, is output, an equation of Vs: Vs=2×N/T−Vo is obtained. Using this equation, the speeds are calculated respectively with the number of pulses obtained by subtracting one by one from the calculation result N=about 65. At the same time, a period of one pulse of the drive signal for driving the stepping motor is also subtracted from the value of the acceleration time Ta=49.57 ms every time when one pulse is subtracted. By repeating the calculation until N reaches zero, the speed table in Table 1 can be generated. Here, a method of acceleration control of a stepping motor using a stepping motor, the initial speed of which is 310 pps and the acceleration time of which until the speed reaches the target speed 2300 pps is 49.57 ms has been described. Since the acceleration time varies depending on the performance of the stepping motor, the above-described acceleration time is an example, and the disclosure is not limited to the acceleration time. The operation of a stepping motor will be described using a stepping motor having the above-mentioned performance below.

Meanwhile, if the stepping motor is accelerated or decelerated linearly (constant acceleration/deceleration) as illustrated in FIG. 9, actually the rotation speed of the stepping motor will exceed the target speed after the rotation speed of the stepping motor reaches the target speed, causing overshoot or undershoot. Therefore, it is necessary to set stabilization time until the rotation speed of the stepping motor stabilizes, or to control the driving power supplied to the stepping motor to be increased to suppress the rotation speed. Alternatively, by controlling the rotation speed of the stepping motor along a gentle curve to reach the target speed rather than acceleration/deceleration control with constant acceleration, occurrence of overshoot and undershoot can be avoided. However, when the rotation speed is controlled along a gentle curve, calculation of the rotation speed of the stepping motor is required each time, causing a problem that control using predetermined time and rotation speeds corresponding to the numbers of pulses in Table 1 is not possible.

<Configuration of Image Forming Apparatus>

Figure 1:
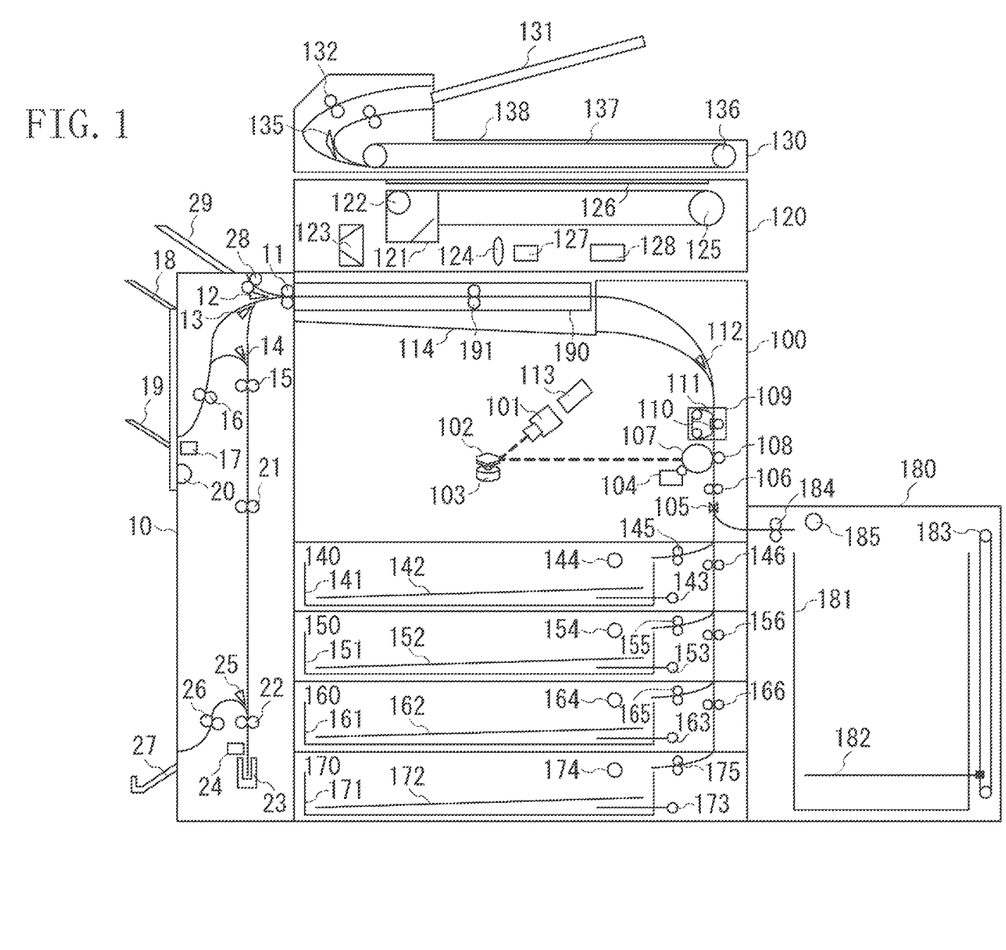
FIG. 1 is a sectional view illustrating a configuration of an image forming apparatus of an exemplary embodiment.

FIG. 1 is a cross-sectional view illustrating a configuration of a digital copying machine that is an example of an electrophotographic image forming apparatus according to the present exemplary embodiment. The digital copying machine according to the present exemplary embodiment includes a document conveyance unit 130, a document reading unit 120, an image forming unit 100, a conveyance unit 190, sheet feeding stages (main body sheet feeding stages 140, 150, 160, 170, and a deck sheet feeding stage 180), and a post-processing apparatus 10. Hereinafter, a configuration and operation of each device included in the digital copying machine will be described.

<Document Conveyance Unit>

In the document conveyance unit 130, documents placed on a document placing tray 131 are conveyed one by one to a platen 126 of the document reading unit 120 by a sheet feeding roller 132. The document is conveyed to a predetermined position of the platen 126 by a document conveyance belt 137 driven and rotated by a motor 136, and the document is read by the document reading unit 120. When the reading of the document is completed, the conveyance path of the document is changed by a flapper 135, the motor 136 is rotated in the opposite direction to rotate the document conveyance belt 137 in the opposite direction, so that the document is discharged to a discharge tray 138.

<Document Reading Unit>

The document reading unit 120 is configured as follows. As an exposure lamp 122, a fluorescent lamp, a halogen lamp, or the like is used. The exposure lamp 122 arranged on a first mirror unit 121 irradiates the document on the platen 126 while moving in the longitudinal direction of the document (in the horizontal direction in FIG. 1). The scattered light from the document by the irradiation from the exposure lamp 122 is reflected by a mirror of the first mirror unit 121 and a second mirror unit 123 and reaches a lens 124. The second mirror unit 123 moves at a speed of ½ with respect to the moving speed of the first mirror unit 121, and the distance from the surface of the document irradiated by the exposure lamp 122 to the lens 124 is always kept constant. In addition, the first mirror unit 121 and the second mirror unit 123 are driven to move by a motor 125. An image on the document is formed on a light receiving portion of a charge-coupled device (CCD) line sensor 127 having thousands of light receiving elements arranged in a row via the first mirror unit 121, the second mirror unit 123, and the lens 124. The CCD line sensor 127 then photoelectrically converts the formed image. The photoelectrically converted signal is processed by a signal processing unit 128 and then output.

<Image Forming Unit>

The image forming unit 100 as an image forming means is configured as follows. An exposure control unit for forming an electrostatic latent image on the photosensitive drum 107 includes an image processing unit 113, a semiconductor laser 101, a rotating polygon mirror 102, and a motor 103. The image processing unit 113 performs processing according to the characteristics of an electrophotography based on the image signal output from the signal processing unit 128, and emits a light beam from the semiconductor laser 101 according to the image signal. The emitted light beam is deflected by the rotating polygon mirror 102, which is rotationally driven by the motor 103, and the photosensitive drum 107 is irradiated with the deflected light beam. Before the photosensitive drum 107 is irradiated with the light beam, residual electric charge on the surface of the photosensitive drum 107 is discharged by a pre-exposure lamp (not illustrated), and the surface of the photosensitive drum 107 is uniformly charged by a primary charger (not illustrated). Thereafter, the photosensitive drum 107 is irradiated with a light beam while rotating, whereby an electrostatic latent image is formed on the surface. A developing device 104 then forms a toner image by causing developer (toner) of a predetermined color to adhere to the electrostatic latent image on the surface of the photosensitive drum 107.

A transfer sheet is fed from the main body sheet feeding stages (hereinafter also referred to as sheet feeding stages) 140, 150, 160, and 170 and the deck sheet feeding stage 180 to be described below, and is conveyed to a registration roller 106. The registration roller 106 detects arrival of the transfer sheet using a sensor 105 and conveys the transfer sheet to a transfer roller 108 while synchronizing a timing when the leading edge of the toner image formed on the photosensitive drum 107 arrives at a transfer position and a timing when the leading edge of the transfer sheet arrives at the transfer position. The transfer roller 108 transfers the toner image on the photosensitive drum 107 to the transfer sheet. After the toner image is transferred to the transfer sheet, the toner on the photosensitive drum 107 left untransferred is removed by a cleaner (not illustrated). The transfer sheet to which the toner image has been transferred is easily separated from the photosensitive drum 107 since the curvature of the photosensitive drum 107 is large. However, by applying a voltage to a discharging needle (not illustrated), suction force between the photosensitive drum 107 and the transfer sheet is weakened to make the transfer sheet further easily separated.

A fixing unit 109 includes a ceramic heater 110, a film 111, and two rollers. The transfer sheet is conveyed to the fixing unit 109 and heated and pressurized, so that the toner image is fixed on the transfer sheet. A direction flapper 112 switches discharge destinations of the transfer sheet to a tray 114 or the conveyance unit 190 according to the operation mode. The conveyance unit 190 is a unit for conveying the transfer sheet to the post-processing apparatus 10, which will be described below, and a conveyance roller 191 conveys the transfer sheet to the post-processing apparatus 10.

<Sheet Feeding Stage>

In the main body of the digital copying machine, the four sheet feeding stages 140, 150, 160, and 170 are provided, and the respective sheet feeding stages are structured with the same sheet feeding mechanism. On the other hand, the deck sheet feeding stage 180 is a sheet feeding stage capable of storing a larger number of transfer sheets than each of the sheet feeding stages 140, 150, 160, and 170 provided in the main body of the image forming apparatus. In the following description, the configuration and operation of the sheet feeding stage 140 will be described as an example, and the configurations or operations of the sheet feeding stages 150, 160, and 170 will not be described because the configurations of the sheet feeding stages are substantially the same. In addition, the members 151 to 156, 161 to 166, and 171 to 175 in FIG. 1 correspond to the members 141 to 146 to be described below respectively.

The sheet feeding stage 140 includes a sheet feeding cassette 141 in which transfer sheets are accumulated and stored. A bottom plate 142 is disposed on the bottom surface of the sheet feeding cassette 141, and is raised or lowered by a lift-up motor 143. By raising the bottom plate 142, the uppermost transfer sheet placed on the sheet feeding cassette 141 is raised to a position where it contacts with a pickup roller 144 at a predetermined standby position and wait ready for feeding the transfer sheet. When the image formation is started, the transfer sheet is fed to the pair of sheet feed rollers 145 by the pickup roller 144. Torque is applied to the pair of sheet feed rollers 145 in a direction opposite to the sheet feed direction. Accordingly, the transfer sheets are conveyed one by one to the conveyance path while preventing double feeding of transfer sheets. Conveyance rollers 146 is a pair of rollers for conveying the transfer sheet conveyed from the sheet feeding stages 150, 160, and 170 provided below the main body sheet feeding stage 140 further upward.

On the other hand, the deck sheet feeding stage 180 has a sheet storage 181 capable of storing a larger amount of transfer sheets than the sheet feeding stage 140. Similar to the sheet feeding stage 140, a bottom plate 182 for raising the uppermost transfer sheet to a predetermined standby position is also disposed on the bottom surface of the sheet storage 181. The bottom plate 182 is driven by a motor 183 and is connected to a moving belt. When the belt moves, the bottom plate 182 is also controlled to be raised or lowered. When the image formation is started, the transfer sheet is conveyed to a pair of sheet feed rollers 184 by a pickup roller 185, and similar to the pair of sheet feed rollers 145 of the main body sheet feeding stage 140, the transfer sheet is conveyed to the conveyance path while preventing double feeding.

<Post-Processing Apparatus>

The post-processing apparatus 10 receives the transfer sheet conveyed from the image forming unit 100 via the conveyance unit 190 at a roller 11. When a tray 29 is selected as a discharge destination of the received transfer sheet, a flapper 12 switches the transfer directions of the transfer sheet, so that transfer sheet is discharged to the tray 29 by a roller 28. The tray 29 is a discharge tray that is temporarily used as a discharge destination of processing interrupted during normal processing, for example.

Normally, the tray 18 or the tray 19 is used as a discharge destination of a transfer sheet. In a case of discharging a transfer sheet to the tray 18 or the tray 19, after the flapper 12 switches the conveyance paths of the transfer sheet to direct the transfer sheet downward, a flapper 13 further selects a conveyance path toward the roller 16. Accordingly, the transfer sheet can be discharged to the tray 18 or the tray 19. When the flapper 13 and a flapper 14 select a conveyance path that is vertically downward, and a reverse roller 15 reverses the conveyance direction, the transfer sheet with the front and back sides reversed can be discharged to the flappers 13 and 14. Further, when a transfer sheet is discharged to the tray 18 or 19, a stapling process using a stapler 17 is possible. In addition, it is possible to select the tray 18 or the tray 19 to which a transfer sheet is discharged by moving the trays 18 and 19 themselves up and down using a shift motor 20.

A tray 27 is a discharge tray to be used in bookbinding. A transfer sheet is conveyed from the reverse roller 15 to a roller 21, and a predetermined number of transfer sheets are placed in a temporary storage portion 23. When the predetermined number of transfer sheets are placed, a bookbinding process is performed by a stapler 24. When the bookbinding process is completed, the direction of the flapper 25 is changed, the roller 22 is rotated in a direction opposite to that when the transfer sheets are placed, and the transfer sheets having been subjected to the bookbinding process is discharged to the tray 27 by a roller 26.

<Configuration of Motor Control Device>

Figure 2:
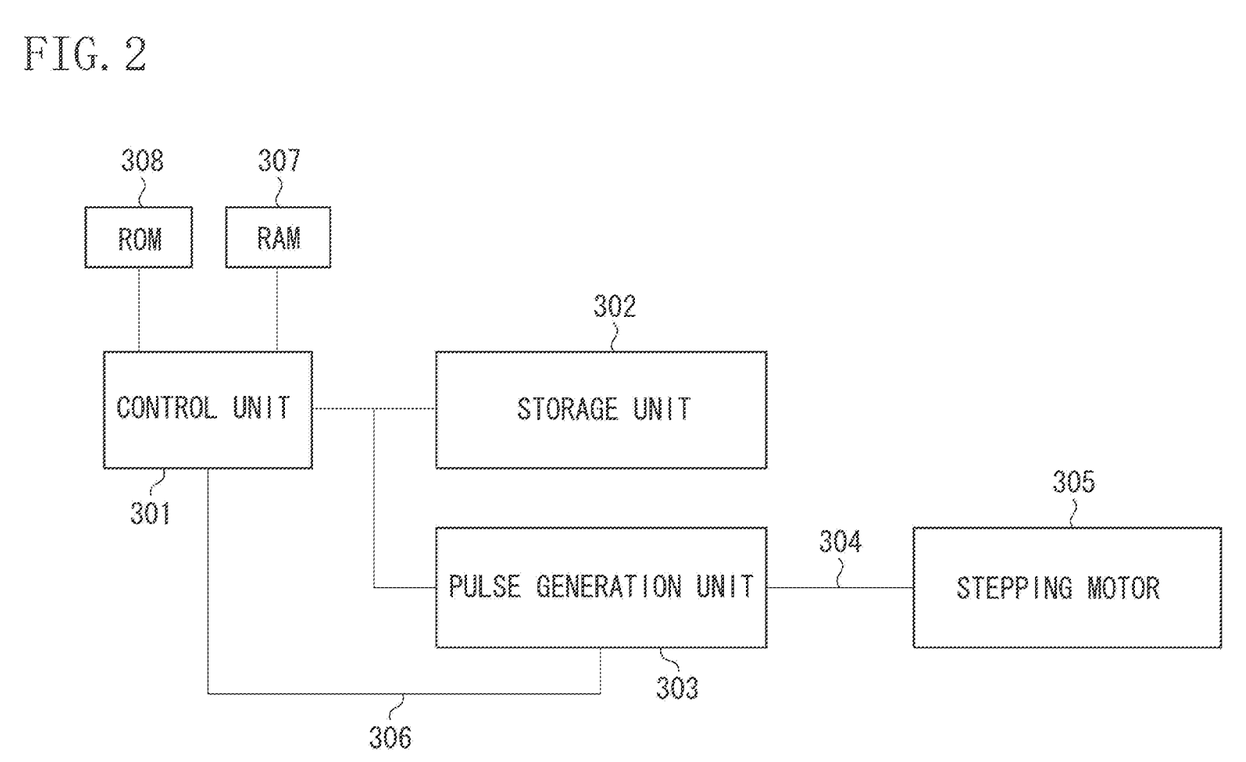
FIG. 2 is a block diagram illustrating a configuration of a stepping motor control device according to the exemplary embodiment.

FIG. 2 is a block diagram illustrating a configuration of a motor control device that controls a stepping motor according to the present exemplary embodiment. A control unit 301 serving as a controller of the motor control device for controlling a stepping motor is connected to a storage unit 302 and the pulse generation unit 303. The control unit 301 may be a processor or a programmable device that may execute a program or instructions stored in a memory to perform operations as described in the following. The control unit 301 controls a stepping motor 305 via the pulse generation unit 303 based on a control program or the like stored in a read only memory (ROM) 308. A random access memory (RAM) 307 is used as a main memory, a work area, and the like of the control unit 301. The storage unit 302 is used as a storage area for controlling the stepping motor 305.

The pulse generation unit 303 is provided for each stepping motor 305, and outputs a drive signal 304, which includes pulse signals, to the connected stepping motor 305 the pulse generation unit 303. The pulse generation unit 303 has a counter (24-bit counter) to which a counter value according to cycles of the drive signal 304 is set, and controls the drive signal 304 according to the counter value. When the counter value reaches zero, the pulse generation unit 303 outputs an output completion signal 306 informing the control unit 301 that output of the drive signal 304 is completed. The counter is driven by a system operation clock (20 MHz), and the count value is updated. In FIG. 2, only one pulse generation unit 303 (thus only one stepping motor 305) is illustrated, but a necessary number (a plurality) of pulse generation units 303 can be connected to the control unit 301. In this way, the control unit 301 can control all stepping motors each connected to corresponding one of the pulse generation units 303. In the present exemplary embodiment, it is assumed that one pulse generation unit 303 is connected to the control unit 301. The control unit 301 may be a central processing unit (CPU) of the above-described digital copying machine, a control unit dedicated to control the stepping motor, or an application-specific integrated circuit (ASIC).

<Control Sequence of Stepping Motor>

Figure 3:
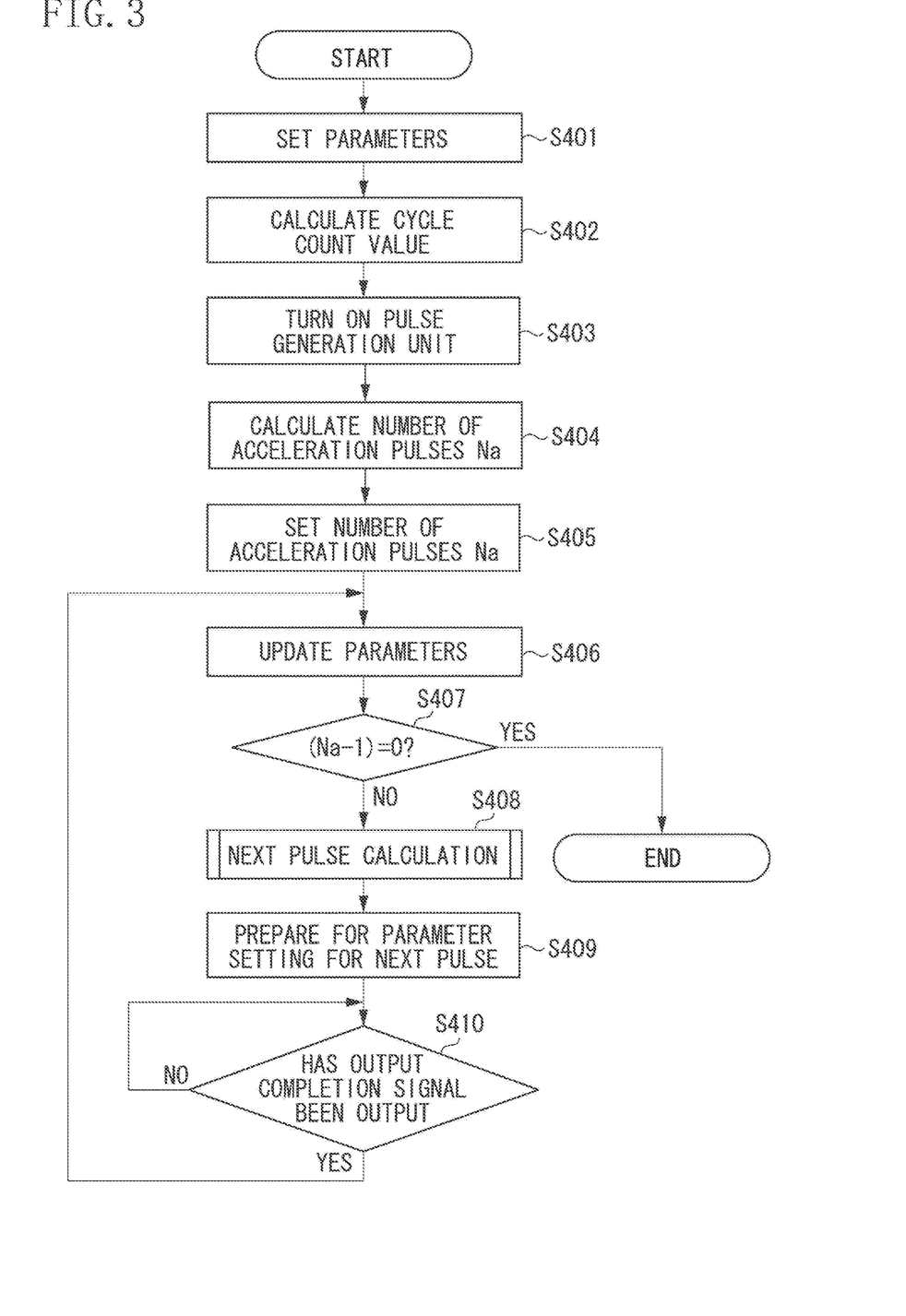
FIG. 3 is a flowchart illustrating a control sequence of the stepping motor according to the exemplary embodiment.

A control sequence of the stepping motor will be described with reference to a flowchart in FIG. 3. The processing illustrated in FIG. 3 is started when a print instruction is received from an operation unit (not illustrated) of the digital copying machine or a computer on the network to which the digital copying machine is connected, and is performed by the control unit 301. In the following description, as an example, lifting control by the lift-up motor 143, which is a stepping motor for raising and lowering the bottom plate 142 provided in the sheet feeding stage 140 of the digital copying machine in FIG. 1, will be described.

In step S401, the control unit 301 sets a self-start speed Vs, a target speed Vo, and acceleration time Ta, which are parameters for controlling the lift-up motor 143, in storage areas for the lift-up motor 143 of the storage unit 302. The control unit 301 also calculates a speed difference S_VsVo between the target speed Vo and the self-start speed Vs using an equation: $S\_VsVo=Vo-Vs$, and sets the speed difference S_VsVo in a storage area of the storage unit 302. Similarly, the control unit 301 calculates a speed sum A_VsVo of the target speed Vo and the self-start speed Vs using an equation: $A\_VsVo=Vo+Vs$, and sets the speed sum A_VsVo in a storage area of the storage unit 302. The control unit 301 also calculates an initial value of time Tx representing elapsed time from the start of driving the stepping motor 305 using an equation: $Tx=-(acceleration\ time\ Ta/2)$, and sets the time Tx in a storage area of the storage unit 302. The time Tx represents the elapsed time that is the sum of periods of the drive signal 304 having been output from the pulse generation unit 303 since the start of the acceleration control of the stepping motor 305 to be described below.

Figure 4:
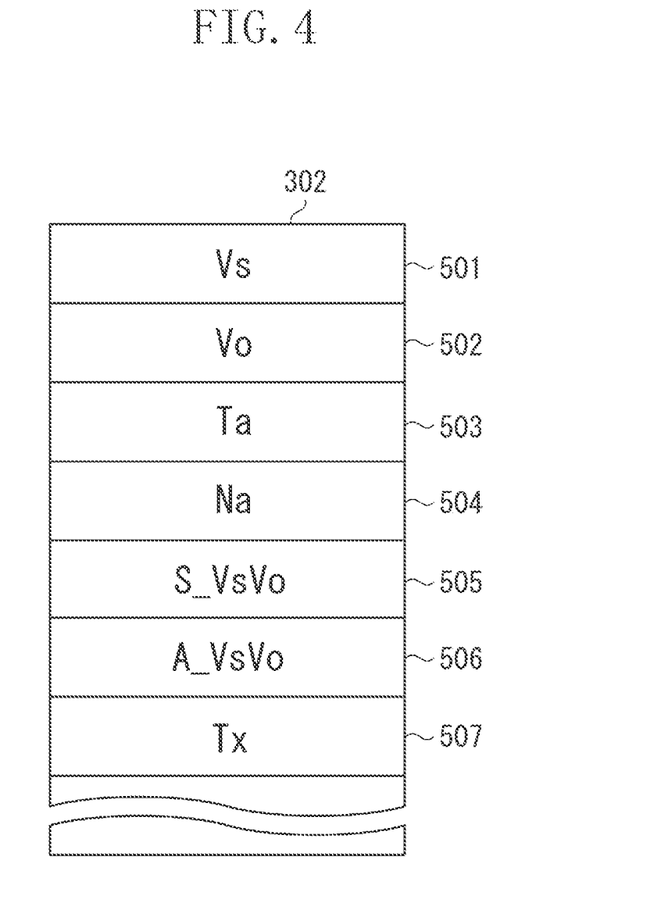
FIG. 4 is a diagram illustrating a storage area of a storage unit according to the exemplary embodiment.

FIG. 4 illustrates a configuration of storage areas for the lift-up motor 143 in the storage unit 302 according to the present exemplary embodiment. In FIG. 4, reference numerals 501 to 507 indicate addresses of the storage areas of the storage unit 302. Values of the self-start speed Vs, the target speed Vo, the acceleration time Ta, the speed difference S_VsVo, the speed sum A_VsVo, and the time Tx are respectively set in the storage areas 501, 502, 503, 505, 506, and 507 of the storage unit 302. The number of pulses Na set in a storage area 504 will be described below. In the present exemplary embodiment, the self-start speed Vs is 310 pps (pulse/second), the target speed Vo is 2300 pps, and the acceleration time Ta is 49.57 ms (milliseconds). As a result, the value of the speed difference S_VsVo set in the storage area 505 is 1990 pps (=2300 pps−310 pps). The speed sum A_VsVo set in the storage area 506 is 2610 pps (=2300 pps+310 pps). The time Tx is −24.785 ms (=−49.57 ms/2). In addition, the control unit 301 calculates the self-start speed period Ts from the self-start speed Vs using an equation: $Ts=1/Vs$. Specifically, when the self-start speed period Ts is calculated based on the self-start speed Vs=310 pps, the self-start speed period Ts is 3.225806 ms (milliseconds) ($\approx$1/310 (pulse/second)×1000).

In step S402, the control unit 301 calculates the cycle count value Tc based on the self-start speed period Ts Vs calculated in step S401, and sets the cycle count value Tc to the counter in the pulse generation unit 303 described above. In the present exemplary embodiment, the counter of the pulse generation unit 303 is updated by a clock of 20 MHz (one period is 50 ns (nanoseconds)) that is the system operation clock. The cycle count value Tc is calculated from the self-start speed period Ts/system operating clock period. Therefore, the cycle count value Tc is 64516 ($\approx$3.225806 ms/50 ns).

In step S403, the control unit 301 instructs the pulse generation unit 303 to start operation to turn on the pulse generation unit 303. The pulse generation unit 303 sets the cycle count value Tc calculated in step S402, and loads the cycle count value into the counter. Then, the pulse generation unit 303 starts updating (subtracting) the cycle count value Tc set to the counter and outputs the drive signal 304 to the stepping motor 305. A detailed operation of the pulse generation unit 303 will be described below.

In step S404, the control unit 301 calculates the number of acceleration pulses Na required to accelerate the stepping motor 305 from the self-start speed Vs to the target speed Vo. The number of acceleration pulses Na is calculated assuming that acceleration in this case is linear acceleration of constant acceleration. As described with reference to FIG. 9, the number of acceleration pulses Na is the area of the trapezoid calculated using an equation: $Na=(self-start\ speed\ Vs+target\ speed\ Vo)\times acceleration\ time\ Ta/2$. Specifically, the (self-start speed Vs+target speed Vo) is 2610 pps (pulse/second) using the speed sum A_VsVo set in the storage area 506 and the acceleration time Ta is 49.57 ms (milliseconds) set in the storage area 503. From calculation of the number of acceleration pulses Na based on these values, Na is 65 pulses ($\approx$2610 pps (pulse/second)×0.04957 (second)/2). In step S405, the control unit 301 sets the number of acceleration pulses Na calculated in step S404 in the storage area 504 of the storage unit 302.

In step S406, the control unit 301 updates the time Tx set in the storage area 507 of the storage unit 302 to calculate a pulse to be output next by the pulse generation unit 303, and updates the parameters. For example, when the processing of step S406 is performed for the first time after start of the processing in FIGS. 3, −24.785 ms (milliseconds) (=−(acceleration time Ta/2)) is set in the storage area 507 of the storage unit 302 in the processing of step S401. The time Tx at this time corresponds to a position ($-\pi/2$) in FIG. 5 to be described below. By adding the self-start speed period Ts, which has been set to the pulse generation unit 303 in step S403, to the value of the time Tx in this case, time Tx elapsed until the period Ts is set in the pulse generation unit 303 for the next time can be obtained. The control unit 301 sets the obtained value (time) as the time Tx again in the storage area 507 of the storage unit 302. Specifically, the time Tx set in the storage area 507 at this time is −21.559194 ms (=−24.785 ms+3.225806 ms).

In step S407, the control unit 301 decrements the value of the number of pulses Na set in the storage area 504 of the storage unit 302 by one, and determines whether the value of the number of pulses Na after the decrement by one is zero. If the control unit 301 determines that the value of the number of pulses Na after the decrement by one is zero (YES in step S407), the control unit 301 terminates the processing, and if the control unit 301 determines that the value is not zero (NO in step S407), the processing proceeds to step S408.

Figure 6:
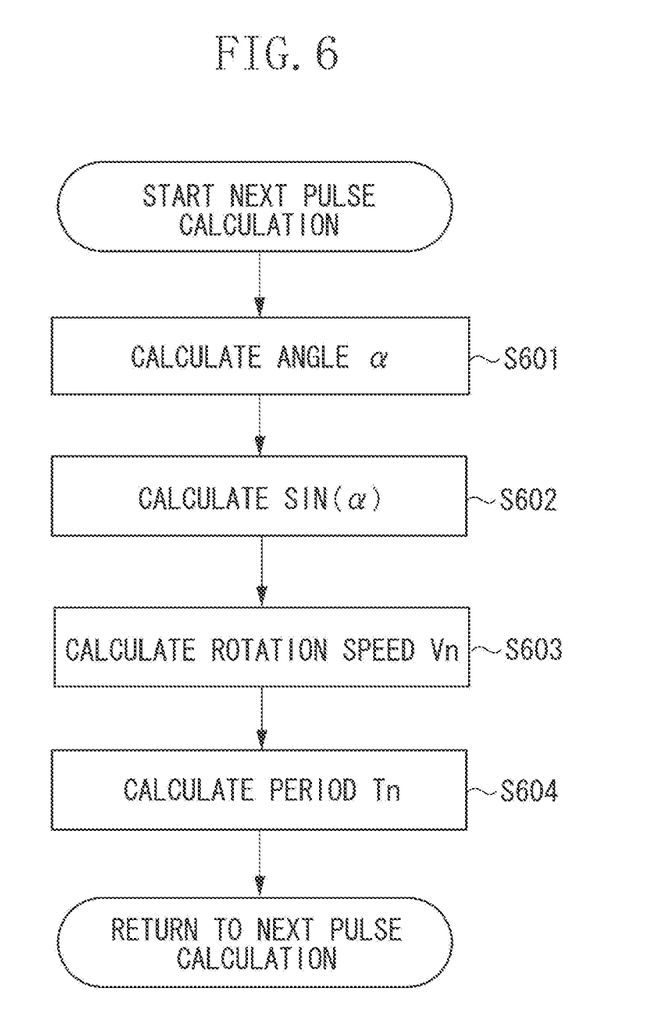
FIG. 6 is a flowchart illustrating a control sequence of next pulse calculation according to the exemplary embodiment.

In step S408, the control unit 301 calculates the rotation speed and the corresponding rotation period of the stepping motor 305 (next pulse calculation) when the pulse generation unit 303 outputs a next drive signal to the stepping motor 305. The processing of step S408 is performed by activating processing illustrated in FIG. 6 (described below). In the processing of FIG. 6, a rotation speed Vn and a corresponding rotation period Tn of the stepping motor 305 are calculated based on the waveform of a sinusoidal wave (also referred to as SIN wave, or sine curve) which is a feature of the disclosure. In step S409, the control unit 301 prepares for parameter setting for the next pulse. Specifically, the control unit 301 calculates the cycle count value Tc based on the rotation period Tn calculated in step S408, and sets the cycle count value Tc to the pulse generation unit 303 together with the rotation period Tn calculated in step S408.

In step S410, the control unit 301 determines whether the output completion signal 306 informing that output of the drive signal 304 from the pulse generation unit 303 is completed has been output. If the control unit 301 determines that the output completion signal 306 has been output (YES in step S410), the control unit 301 causes the pulse generation unit 303 to load the rotation period Tn and the cycle count value Tc set in step S409 into the counter, and to start operating according to the next drive signal 304. The processing then returns to step S406. On the other hand, if the control unit 301 determines that the output completion signal 306 has not been output (NO in step S410), the processing returns to step S410. The pulse generation unit 303 after completion of the processing illustrated in FIG. 3 in step S407 continues to control the stepping motor 305 based on the rotation period Tn and the cycle count value Tc set last.

FIG. 3 described above is a flow chart illustrating a control sequence when acceleration control of the stepping motor is performed. When deceleration control of the stepping motor is performed, "acceleration time Ta/2" is set as an initial value to the time Tx to be set in the storage area 507 of the storage unit 302 in the processing of step S401. The time Tx is controlled to sequentially be subtracted by the rotation period Tn of the drive signal 304 of the stepping motor from "acceleration time Ta/2" set as the initial value each time when the drive signal 304 is output. The other processes are similar to those in the case of the acceleration control of the stepping motor, and the description thereof is not repeated here.

<Rotation Control of Stepping Motor>

Figure 5:
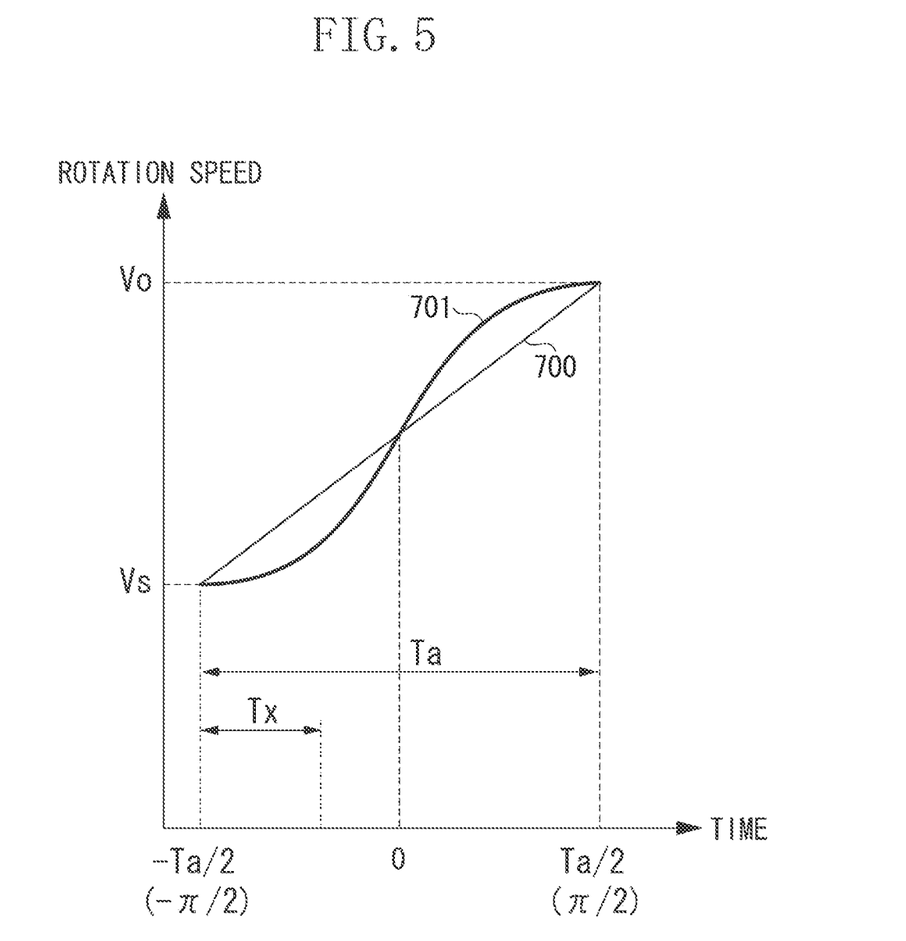
FIG. 5 is a graph illustrating change in rotation speed of the stepping motor according to the exemplary embodiment.

FIG. 5 is a graph illustrating rotation control during acceleration of the stepping motor 305 according to the present exemplary embodiment. In the present exemplary embodiment, in order to perform smooth acceleration control instead of acceleration control by constant acceleration on a stepping motor, acceleration control is performed in such a manner that the rotation speed of the stepping motor changes to follow a sinusoidal wave (sine curve) waveform (shape). In FIG. 5, the vertical axis represents the speed of the stepping motor 305 and the horizontal axis represents the time. The speeds Vs and Vo in FIG. 5 respectively represent the self-start speed and the target speed of the stepping motor 305, and the time Ta represents the acceleration time from the self-start speed Vs to the target speed Vo. The time Tx represents elapsed time from the start of acceleration of the stepping motor 305. In FIG. 5, the angle of the sinusoidal wave (SIN wave) at the self-start speed Vs (when the time Tx stored in the storage area 507 of the storage unit 302 is −(acceleration time Ta/2)) is assumed to be (−π/2). In addition, the angle of the sinusoidal wave at the target speed Vo (when the time Tx stored in the storage area 507 of the storage unit 302 is (acceleration time Ta/2)) is assumed to be (π/2). Then, in a sinusoidal waveform 701 from SIN(−π/2) to SIN(π/2), a point at (−π/2) is assumed to be the self-start speed Vs and a point at (π/2) is assumed to be the target speed Vo, thereby performing acceleration control of the stepping motor 305 along a smooth S-shaped curve.

In FIG. 5, a waveform 700 indicated by a straight line is a speed waveform in the case of constant acceleration from the self-start speed Vs to the target speed Vo. On the other hand, the waveform 701 is a waveform of the rotation speed of the stepping motor in the case of acceleration from the self-start speed Vs to the target speed Vo along the sinusoidal waveform. When the waveform 700 and the waveform 701 are compared, the sinusoidal waveform 701 is lower than the waveform 700 that is indicated by the straight line on the left side of the center position where the waveform 700 and the waveform 701 intersect with each other (the position where the time Tx is zero (the angle is zero)). In other words, the rotation speed of the stepping motor 305 is lower when the rotation speed of the stepping motor 305 is accelerated along the waveform 701, which is a sinusoidal wave, than that when the rotation speed is constantly accelerated along the waveform 700. On the other hand, on the right side of the center in FIG. 5, the sinusoidal waveform 701 is higher than the waveform 700. In other words, the rotation speed of the stepping motor 305 is higher when the rotation speed of the stepping motor 305 is accelerated along the waveform 701, which is a sinusoidal wave, than that when constant acceleration is performed on the rotation speed as the waveform 700. As a result, areas surrounded by the waveform 700 and the waveform 701 are equal across the center where the waveform 700 and the waveform 701 intersect.

As described above, the stepping motor 305 moves forward by a value corresponding to the rotation speed V and the period T by one pulse of the drive signal 304. In FIG. 5, the value can be expressed as an area (=rotation speed V×cycle T). Therefore, an area of the trapezoidal shape between the time (−Ta/2) to the time (Ta/2) and the waveform 700, which is the constant acceleration line, in FIG. 5 is total number of pulses in the case where constant acceleration is performed from the self-start speed Vs to the target speed Vo. Similarly, the area between the time (−Ta/2) to the time (Ta/2) and the waveform 701, which is a sinusoidal wave, in FIG. 5 is total number of pulses in the case where constant acceleration is performed from the self-start speed Vs to the target speed Vo. Therefore, in the present exemplary embodiment, the calculation of the number of pulses Na from the self-start speed Vs to the target speed Vo is performed under the condition of the waveform 700, which is the constant acceleration line, and the calculation of the period of the drive signal 304 for driving the stepping motor 305 is performed using the sinusoidal waveform 701. Here, when the sinusoidal waveform 701 is represented by SIN (α), the rotation speed Vn of the stepping motor 305 can be expressed by the following equation (1).

$$\text{rotation speed } Vn = (Vs + Vo)/2 + (Vo - Vs)/2 \times \text{SIN}(\alpha) \quad (1)$$

<Calculation Sequence of Speed/Period of Next Pulse>

FIG. 6 is a flowchart illustrating a control sequence of the next pulse calculation performed in step S408 of FIG. 3. The processing in FIG. 6 is activated when the processing of step S408 in FIG. 3 is performed, and the control unit 301 performs the processing. When the processing is completed, the processing returns to the processing of FIG. 3, and the control unit 301 next performs the processing of step S409. In the present exemplary embodiment, the rotation speed of the stepping motor 305 is controlled based on the sinusoidal waveform to realize smooth acceleration/deceleration of the stepping motor 305.

In step S601, the control unit 301 obtains the value of the angle α of the SIN (sine) function in the above-described equation. The time Tx in FIG. 5 is set in the storage area 507 of the storage unit 302 by the processing of step S406 in FIG. 3 described above. In the present exemplary embodiment, the ratio between the time Tx set in the storage area 507 and the acceleration time Ta set in the storage area 503 of the storage unit 302 is normalized from $(-\pi/2)$ to $(\pi/2)$, so that the angle α can be obtained. More specifically, the angle α can be obtained by the following equation (2).

$$\text{angle } \alpha = \text{time } Tx \times (\pi/\text{time } Ta) = \pi \times \text{time } Tx/\text{time } Ta \quad (2)$$

As described above, for example, when the processing of step S406 is performed for the first time, the time Tx set in the storage area 507 is −21.559194 ms (=−24.785 ms+3.225806 ms). In this case, the angle α obtained in step S601 is $\alpha = \pi \times (-21.559194 \text{ ms})/(49.57 \text{ ms}) \approx -1.36635$ using equation (2).

In step S602, the control unit 301 calculates SIN(α) using the angle α calculated in step S601. In the present exemplary embodiment, SIN(α) is calculated using an approximation formula of Maclaurin expansion. More specifically, in this case, SIN(α) is calculated by using the following equation (3), which is an approximate equation of Maclaurin expansion.

$$SIN(\alpha) = \alpha - 1/3! \times \alpha^3 + 1/5! \times \alpha^5 \quad (3)$$

Specifically, when SIN(α) can be obtained using equation (3): $SIN(\alpha) = (-1.36635) - 1/6 \times (-1.36635)^3 + 1/120 \times (-1.36635)^5 = -0.9808936$.

In step S603, the control unit 301 calculates the rotation speed Vn of the stepping motor 305 using the following equation (4).

$$\text{rotation speed } Vn = (Vs+Vo)/2 + (Vo-Vs)/2 \times SIN(\alpha) \quad (4)$$

In this equation, equation (4) can be expressed as the following equation (5) by using the speed difference S_VsVo and the speed sum A_VsVo respectively stored in the storage areas 505 and 506 of the storage unit 302.

$$\text{rotation speed } Vn = \text{speed sum } A\_VsVo/2 + \text{speed difference } S\_VsVo/2 \times SIN(\alpha) = ((\text{speed sum } A\_VsVo + \text{speed difference } S\_VsVo \times SIN(\alpha))/2 \quad (5)$$

Specifically, when the rotation speed Vn is obtained using equation (4), the rotation speed $Vn = (2610 + 1990 \times 0.9808936))/2 \approx 329$ pps (pulse/second).

In step S604, the control unit 301 calculates the rotation period Tn by using the equation: the rotation period Tn=1/rotation speed Vn, based on the rotation speed Vn calculated in step S603. Specifically, the rotation period Tn is the rotation period $Tn = 1/329$ pps (pulse/second) $\times 1000 \approx 3.039514$ ms (milliseconds). Upon completing the processing of step S604, the processing returns to the processing of FIG. 3 and the control unit 301 performs the processing of step S409.

FIG. 6 is a flowchart illustrating a control sequence in acceleration control of the stepping motor 305, but a control sequence in deceleration control is similar to that in acceleration control. FIG. 5 described above is a graph illustrating change in the rotation speed of the stepping motor 305 in acceleration control. In the deceleration control, the speed (initial speed) at start is the speed Vo in FIG. 5 and the target speed is the speed Vs in FIG. 5, and the rotation speed of the stepping motor 305 is reduced from the speed Vo to the speed Vs along the sinusoidal waveform 701 in FIG. 5. Therefore, by normalizing the graph in FIG. 5 with respect to the time Tx, which is the elapsed time from the start of the deceleration control, with setting of the angle α to π/2 at the speed Vo and (−π/2) at the speed Vs, the control sequence in FIG. 6 can also be applied to the next pulse calculation in the deceleration control.

<Operation of Pulse Generation Unit>

Figure 7:
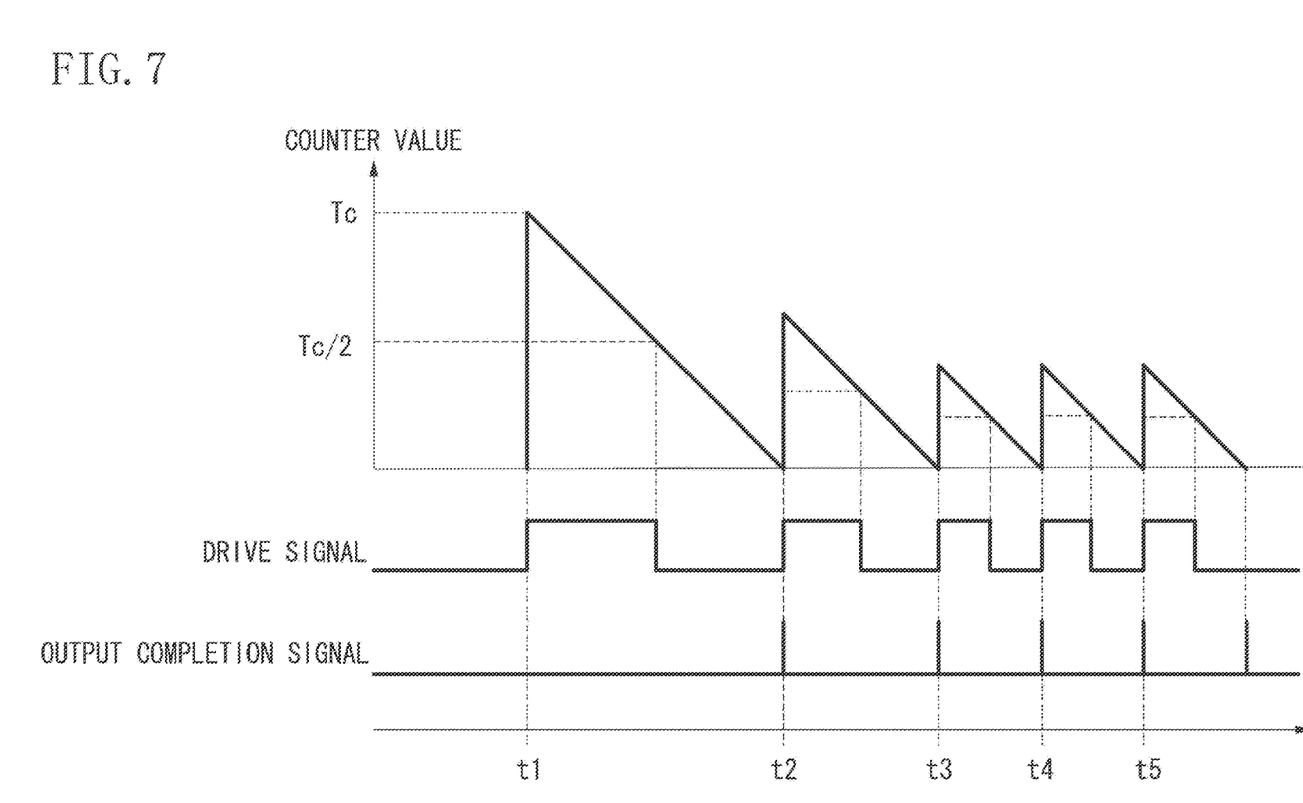
FIG. 7 is a timing chart illustrating operation of a pulse generation unit according to the exemplary embodiment.

FIG. 7 is a timing chart illustrating the operation of the pulse generation unit 303. In FIG. 7, the graph located at the uppermost position illustrates change in the counter value of the counter of the pulse generation unit 303, the signal waveform located at the middle position illustrates the drive signal 304 that the pulse generation unit 303 outputs to the stepping motor 305 (FIG. 2). The signal waveform located at the lowermost position illustrates the output completion signal 306 output to the control unit 301 when the counter value reaches zero (FIG. 2). The horizontal axis of FIG. 7 represents the time, and times t1 to t5 each represent a time (timing).

The counter included in the pulse generation unit 303 is a 24-bit counter, and operates by the system operation clock of 20 MHz (one clock cycle is 50 ns (nanoseconds)). Before the pulse generation unit 303 starts the operation (step S403 in FIG. 3), the control unit 301 sets the cycle count value Tc in advance to the pulse generation unit 303 (step S402 in FIG. 3). Upon starting the operation (step S403 in FIG. 3), the pulse generation unit 303 loads the cycle count value Tc as the initial value into the counter and starts countdown. The system operation clock of 20 MHz is input to the counter, and the counter value is decremented by one every 50 ns (nanoseconds).

The pulse generation unit 303 loads the cycle count value Tc into the counter. The pulse generation unit 303 further sets the drive signal 304 to be output to the stepping motor 305 to a high level, and when the counter value reaches ½ of the cycle count value Tc (=Tc/2) or less, the pulse generation unit 303 sets the drive signal 304 to a low Level. Through this control, the drive signal 304 having a duty of 50% is output to the stepping motor 305 (signal waveform of the driving signal in FIG. 7). When the counter value reaches zero (time t2 in FIG. 7), the pulse generation unit 303 outputs the output completion signal 306 to inform the control unit 301 that the output of the drive signal 304 to the stepping motor 305 has completed (signal waveform of the output completion signal in FIG. 7). Upon detecting the output completion signal 306 from the pulse generation unit 303 (step S410 in FIG. 3), the control unit 301 updates the parameters (step S406 in FIG. 3) to perform the next pulse calculation.

In addition, the control unit 301 completes the next pulse calculation (step S408 in FIG. 3) before the pulse generation unit 303 outputs the output completion signal 306, and sets, to the pulse generation unit 303, the cycle count value Tc to be loaded next into the counter (step S409 in FIG. 3). Upon outputting the output completion signal 306, the pulse generation unit 303 loads the cycle count value Tc corresponding to the drive signal 304 to be output next to start countdown, and outputs the drive signal 304. In this way, the next pulse calculation is completed and the next cycle count value Tc is set. Accordingly, the pulse period is changed for every pulse of the drive signal 304, and acceleration/deceleration control of the stepping motor 305 is realized. As a result, while making change of the rotation speed of the stepping motor 305 along a smooth S shape (sinusoidal waveform) illustrated in FIG. 6, the rotation speed control (pulse number control) of the stepping motor 305 according to the number of pulses of the drive signal 304 having been output to the stepping motor 305 is possible.

<Control of Lift-Up Motor>

Figure 8:
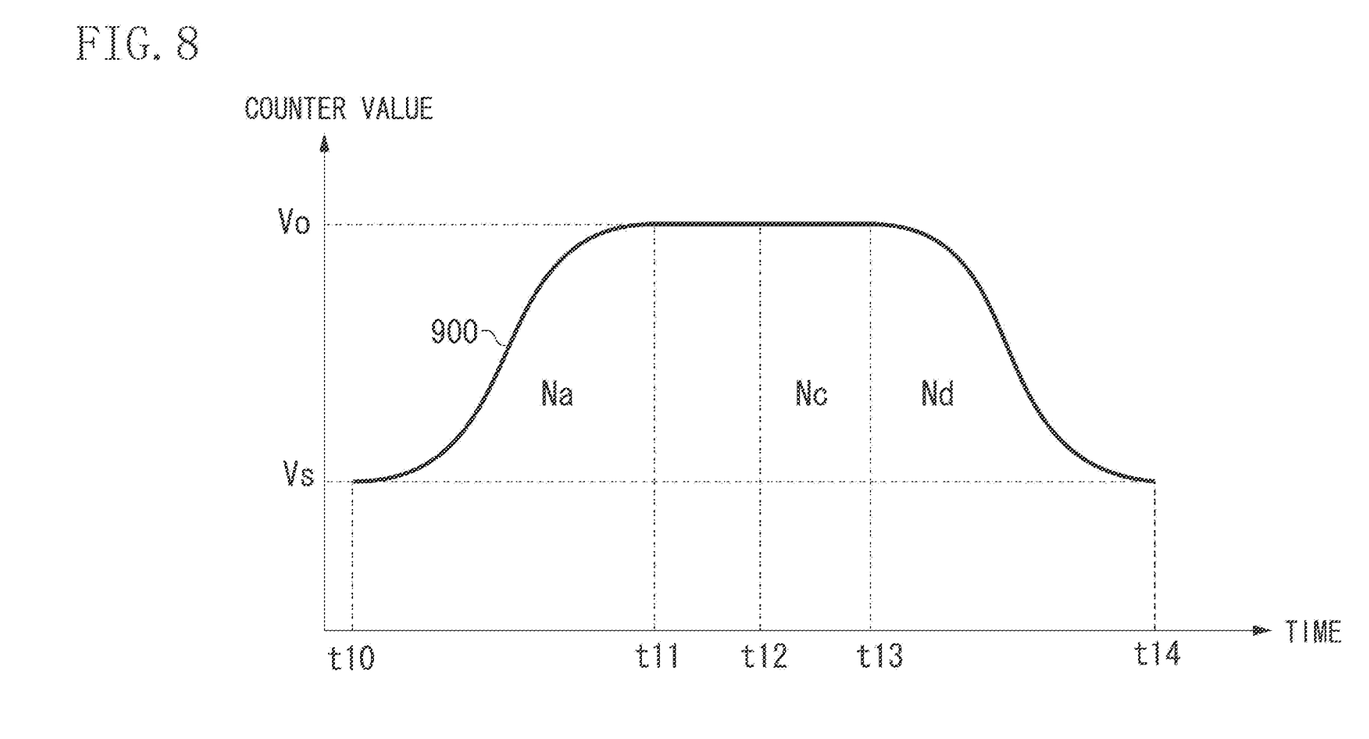
FIG. 8 is a speed diagram of a lift-up motor of the exemplary embodiment.

FIG. 8 is a speed diagram illustrating change in speed of the lift-up motor 143 when the bottom plate 142 of the sheet feed cassette 141 is raised to a predetermined position so that an uppermost transfer sheet of a sheet bundle placed on the bottom plate 142 of the sheet feeding cassette 141 comes into contact with the pickup roller 144. The vertical axis in FIG. 8 represents the speed of the lift-up motor 143, and the horizontal axis represents the time. In addition, times t10 to t14 each represent a time (timing). In FIG. 8, the speeds Vs and Vo respectively represent the self-start speed and target speed of the lift-up motor 143 in raising the bottom plate 142.

At time t10, the control unit 301 starts driving the lift-up motor 143, which is a stepping motor, at the self-start speed Vs via the pulse generation unit 303, and accelerates the lift-up motor 143 smoothly toward the target speed Vo along a curve 900 of an S-shaped sinusoidal wave (sine curve). Through this control, the sheet bundle placed on the bottom plate 142 is raised toward the pickup roller 144. When the rotation speed of the lift-up motor 143 reaches the target speed Vo at time t11, the control unit 301 continues the rotation of the lift-up motor 143 to further raise the bottom plate 142 while maintaining the rotation speed at the target rotation speed Vo. The number of pulses of the drive signal output from the pulse generation unit 303 to accelerate the lift-up motor 143 from time t10 to time t11 is the number of acceleration pulses Na (65 pulses) set in the storage area 504 described above.

When the lift-up sensor (not illustrated) detects the sheet bundle placed on the bottom plate 142 at time t12, the lift-up sensor outputs the detection result to the control unit 301. Based on the detection result from the lift-up sensor, the control unit 301 performs control to stop the rotation of the lift-up motor 143 at a position moved forward from the position at time t12 by 100 pulses of the lift-up motor 143 (position where the bottom plate 142 is further raised by 5 mm). The number of pulses output by the pulse generation unit 303 when the rotation speed of the lift-up motor 143 is decelerated from the speed Vo to the self-start speed Vs can be calculated similarly to the case of acceleration control described above. More specifically, the speeds Vo and Vs, and the deceleration time Ta are the same as those in acceleration, and the number of pulses Nd required for deceleration is 65 pulses, which is the same as the number of acceleration pulses Na. The lift-up motor 143 can be stopped at the position where the pulse generation unit 303 outputs 100 pulses of the drive signal from time t12 when the control unit 301 performs the following control. The control unit 301 can realize such control by performing deceleration processing after the pulse generation unit 303 outputs Nc (=100−Nd) pulses of the drive signal to the lift-up motor 143 from time t12. Specifically, from time t12, the control unit 301 maintains the current rotation speed Vo until time t13 when the pulse generation unit 303 outputs 35 pulses (=100 pulses−Nd=100 pulses−65 pulses) from time t12, and at time t13, the control unit 301 starts deceleration processing. In the deceleration processing, by performing similar processing to the acceleration control described above, raising the bottom plate 142 can be stopped at a predetermined self-start speed at time t14.

As described above, according to the present exemplary embodiment, smooth acceleration/deceleration control of the stepping motor by specifying the numbers of pulses can be performed. Through the smooth acceleration/deceleration control of the stepping motor, it is possible to reduce the time for stabilizing the rotation speed after the stepping motor reaches the target speed from that in a case where the stepping motor is controlled by constant acceleration. As a result, power consumption of the stepping motor can be reduced, and waiting time for stabilizing the rotation speed can be reduced. Therefore, the speed of image formation by the image forming apparatus can be increased.

Other Exemplary Embodiment

In the present exemplary embodiment, a digital copying machine has been described by way of example. However, the disclosure enables both smooth acceleration/deceleration control of a stepping motor and pulse number (position) control, and thus can be applied to other image forming apparatuses. More specifically, the disclosure can be applied to a digital multifunction imaging apparatus incorporating a stepping motor, and an image forming apparatus such as a laser beam printer, and a facsimile.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-239281, filed Dec. 9, 2016, which is hereby incorporated by reference herein in its entirety.

What is claimed is:

1. A motor control device comprising:
    a pulse generation unit connected to a stepping motor and configured to output pulse signals for driving the stepping motor; and a controller configured to control the pulse generation unit to perform acceleration control or deceleration control of the stepping motor, wherein the controller calculates a number of the pulse signals to be output from the pulse generation unit to the stepping motor when accelerating or decelerating the stepping motor at constant acceleration in the acceleration control or the deceleration control based on an initial speed of the stepping motor when the acceleration control or the deceleration control starts, a target rotation speed, and time from start of the acceleration control or the deceleration control of the stepping motor to time when the stepping motor reaches the target rotation speed, and wherein the controller changes a rotation speed of the stepping motor in the acceleration control or the deceleration control along a sinusoidal waveform.

2. The motor control device according to claim 1, wherein the controller calculates the number of the pulse signals Na to be output from the pulse generation unit to the stepping motor using an equation:

$$Na=(Vs+Vo) \times Ta/2$$

where Na is the number of the pulse signals to be output from the pulse generation unit to the stepping motor, Vs is the initial speed of the stepping motor, Vo is the target rotation speed, and Ta is the time until the speed of the stepping motor reaches the target rotation speed from starting the acceleration control or the deceleration control.

3. The motor control device according to claim 2, wherein the controller calculates the rotation speed Vn of the stepping motor using an equation:

$$Vn=(Vs+Vo)/2+(Vo-Vs)/2 \times SIN(\alpha)$$

where Vn is the rotation speed of the stepping motor, and $\alpha$ is an angle corresponding to sum of periods of the pulse signals having been output to the stepping motor since the start of the acceleration control or the deceleration control.

4. The motor control device according to claim 3, wherein the controller normalizes the time Ta in such a manner that the time Ta corresponds to an angle from $(-\pi/2)$ to $(\pi/2)$ in the acceleration control and from $(\pi/2)$ to $(-\pi/2)$ in the deceleration control, and calculates the angle $\alpha$ according to the sum of the periods of the pulse signals.

5. The motor control device according to claim 4, wherein the controller controls the pulse generation unit to maintain the rotation speed of the stepping motor at the rotation speed Vo when the rotation speed of the stepping motor reaches the target rotation speed Vo.

6. The motor control device according to claim 5, wherein in a case where the number of the pulse signals Na is smaller than a predetermined number of pulses specified in the deceleration control of the stepping motor, the controller controls the pulse generation unit to maintain the rotation speed of the stepping motor at the current rotation speed until a number of remaining pulse signals to be output reaches the calculated number of the pulse signals Na.

7. The motor control device according to claim 2, wherein the initial speed Vs in the acceleration control of the stepping motor and the target rotation speed Vo in the deceleration control are a self-start speed of the stepping motor.

8. The motor control device according to claim 1,
wherein the pulse generation unit includes a counter, and
wherein the pulse generation unit sets a counter value that is set in advance by the controller to the counter according to an instruction from the controller, then update the counter value, and output a completion signal to the controller when the counter value reaches zero.

9. The motor control device according to claim 8, wherein the controller calculates a period of pulse signals to be output next from the pulse generation unit before the pulse generation unit outputs the completion signal, and set the counter value corresponding to the calculated period to the counter of the pulse generation unit.

10. The motor control device according to claim 9, wherein the pulse generation unit outputs the pulse signals to the stepping motor when the counter value is set to the counter.

11. The motor control device according to claim 10, wherein the pulse generation unit controls a duty of the pulse signals based on the counter value of the updated counter.

12. The motor control device according to claim 1,
wherein the pulse generation unit is connected to the one stepping motor, and
wherein the motor control device further includes another pulse generation unit.

* * * * *